United States Patent
Howard et al.

(10) Patent No.: US 10,176,354 B2
(45) Date of Patent: *Jan. 8, 2019

(54) SYSTEMS AND METHODS FOR SERVING PIXEL MAPPED CONTENT TO MERCHANDISING COMMUNICATION SYSTEMS

(71) Applicant: CLOVERLEAF MEDIA LLC, San Diego, CA (US)

(72) Inventors: Kevin Brent Howard, Laguna Niguel, CA (US); Gordon Davidson, Irvine, CA (US)

(73) Assignee: Cloverleaf Media, LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/669,281

(22) Filed: Aug. 4, 2017

(65) Prior Publication Data

US 2017/0337409 A1   Nov. 23, 2017

Related U.S. Application Data

(63) Continuation of application No. 15/436,645, filed on Feb. 17, 2017, which is a continuation of application
(Continued)

(51) Int. Cl.
*G06K 19/077* (2006.01)
*G06K 7/14* (2006.01)
(Continued)

(52) U.S. Cl.
CPC ....... *G06K 7/1478* (2013.01); *G06F 3/04847* (2013.01); *G06F 3/147* (2013.01); *G06K 7/1447* (2013.01); *G06K 19/0614* (2013.01); *G06K 19/06037* (2013.01); *G06K 19/06112* (2013.01); *G06K 19/07707* (2013.01); *G06Q 30/0635* (2013.01); *G06F 3/0482* (2013.01); *G09G 2370/025* (2013.01); *G09G 2380/04* (2013.01)

(58) Field of Classification Search
CPC .......... G06K 19/06112; G06K 7/1478; G06K 19/07707; G09G 2380/04; G09F 3/208
USPC ......................................... 235/375, 383, 385
See application file for complete search history.

(56) References Cited

U.S. PATENT DOCUMENTS

D259,408 S    6/1981  Wright et al.
D346,759 S    5/1994  Job et al.
(Continued)

FOREIGN PATENT DOCUMENTS

WO    WO 2016/019352    2/2016

OTHER PUBLICATIONS

International Search Report and Written Opinion for International Application No. PCT/US2015/043316, dated Jan. 22, 2016, 14 pages.
(Continued)

*Primary Examiner* — Suezu Ellis
(74) *Attorney, Agent, or Firm* — Cooley LLP

(57) ABSTRACT

Described herein are systems and methods configured for serving pixel mapped content to one or more merchandising communication systems. A merchandising communication system may be included at a retail environment or other location. Pixel mapped content may include barcodes, text, and other desired content.

16 Claims, 8 Drawing Sheets

Related U.S. Application Data

No. 15/140,416, filed on Apr. 27, 2016, now Pat. No. 9,576,174.

(60) Provisional application No. 62/240,456, filed on Oct. 12, 2015.

(51) Int. Cl.
*G06K 19/06* (2006.01)
*G06F 3/0484* (2013.01)
*G06F 3/147* (2006.01)
*G06Q 30/06* (2012.01)
*G06F 3/0482* (2013.01)

(56) References Cited

U.S. PATENT DOCUMENTS

| | | | |
|---|---|---|---|
| D375,908 S | 11/1996 | Schumaker et al. | |
| D378,065 S | 2/1997 | Levy | |
| D424,068 S | 5/2000 | Takemasa | |
| D424,538 S | 5/2000 | Hayashi et al. | |
| D487,889 S | 3/2004 | Baker | |
| D519,117 S | 4/2006 | Lewis | |
| D534,214 S | 12/2006 | Marcy et al. | |
| D545,693 S | 7/2007 | Iwasaki | |
| D564,990 S | 3/2008 | Ueno | |
| D600,661 S | 9/2009 | Ohki et al. | |
| D607,854 S | 1/2010 | Sagawa | |
| D611,918 S | 3/2010 | Shih et al. | |
| D618,189 S | 6/2010 | Honda | |
| D637,651 S | 5/2011 | Hase et al. | |
| D669,076 S | 10/2012 | Haller | |
| D672,817 S | 12/2012 | Butmir et al. | |
| D681,740 S | 5/2013 | Hase et al. | |
| D693,343 S | 11/2013 | Haller | |
| D714,389 S | 9/2014 | Lee et al. | |
| D739,402 S | 9/2015 | Seoc | |
| D763,965 S | 8/2016 | Mukaide | |
| 9,576,174 B1 | 2/2017 | Howard et al. | |
| D791,617 S | 7/2017 | Howard et al. | |
| 2002/0167500 A1 | 11/2002 | Gelbman | |
| 2003/0037473 A1 | 2/2003 | Pifer | |
| 2004/0160199 A1 | 8/2004 | Morgan et al. | |
| 2004/0178308 A1 | 9/2004 | Bacnik | |
| 2004/0244244 A1 | 12/2004 | Klassen et al. | |
| 2005/0103853 A1 | 5/2005 | Stephenson et al. | |
| 2005/0104806 A1 | 5/2005 | Stephenson | |
| 2005/0128222 A1 | 6/2005 | Huang | |
| 2005/0134549 A1 | 6/2005 | Kamiya et al. | |
| 2005/0218218 A1 | 10/2005 | Koster | |
| 2006/0232495 A1 | 10/2006 | Chang et al. | |
| 2006/0273162 A1 | 12/2006 | Andersson et al. | |
| 2007/0109262 A1 | 5/2007 | Oshima et al. | |
| 2009/0174996 A1 | 7/2009 | Park | |
| 2009/0273443 A1* | 11/2009 | Nilsson | G06F 3/147 340/5.91 |
| 2010/0012600 A1 | 1/2010 | Clontz et al. | |
| 2010/0275267 A1 | 10/2010 | Walker et al. | |
| 2010/0287057 A1 | 11/2010 | Aihara et al. | |
| 2011/0006114 A1 | 1/2011 | Schueller et al. | |
| 2011/0173082 A1 | 7/2011 | Breitenbach et al. | |
| 2011/0181495 A1 | 7/2011 | Chu et al. | |
| 2011/0231285 A1 | 9/2011 | Englund et al. | |
| 2011/0286195 A1 | 11/2011 | Horikiri et al. | |
| 2012/0023797 A1 | 2/2012 | Rosander et al. | |
| 2012/0120327 A1 | 5/2012 | Marx et al. | |
| 2012/0120471 A1 | 5/2012 | Hamalainen et al. | |
| 2012/0191577 A1 | 7/2012 | Gonsalves et al. | |
| 2012/0223875 A1 | 9/2012 | Lau et al. | |
| 2012/0261711 A1 | 10/2012 | Brown et al. | |
| 2013/0117153 A1 | 5/2013 | Shen | |
| 2013/0186962 A1 | 7/2013 | Kennett et al. | |
| 2013/0226742 A1 | 8/2013 | Johnson et al. | |
| 2013/0241431 A1 | 9/2013 | Toyotaka et al. | |
| 2013/0332553 A1 | 12/2013 | Hung et al. | |
| 2013/0335353 A1 | 12/2013 | Segal et al. | |
| 2014/0139548 A1 | 5/2014 | Byers | |
| 2015/0039477 A1 | 2/2015 | O'Neil | |
| 2015/0042540 A1 | 2/2015 | Goel | |
| 2015/0140668 A1 | 5/2015 | Mellars et al. | |
| 2015/0186097 A1 | 7/2015 | Hall | |
| 2015/0262230 A1 | 9/2015 | Cypher et al. | |
| 2015/0332356 A1* | 11/2015 | Byun | G06Q 30/06 345/2.3 |
| 2016/0034244 A1 | 2/2016 | Howard et al. | |
| 2016/0034959 A1 | 2/2016 | Howard et al. | |
| 2016/0034960 A1 | 2/2016 | Howard et al. | |
| 2016/0034988 A1 | 2/2016 | Howard et al. | |
| 2016/0065649 A1 | 3/2016 | Ou | |
| 2016/0078796 A1 | 3/2016 | Cho et al. | |
| 2016/0132822 A1 | 5/2016 | Swafford | |
| 2016/0240131 A1 | 8/2016 | Howard et al. | |
| 2016/0260163 A1 | 9/2016 | Sjodin | |
| 2017/0009971 A1 | 1/2017 | Chan et al. | |
| 2017/0105300 A1 | 4/2017 | Howard et al. | |
| 2017/0315767 A1* | 11/2017 | Rao | G06F 3/147 |

OTHER PUBLICATIONS

International Search Report and Written Opinion for International Application No. PCT/US2016/056461, dated Dec. 2, 2016, 17 pages.

Office Action for U.S. Appl. No. 15/140,416, dated Aug. 18, 2016, 23 pages.

International Search Report and Written Opinion for International Application No. PCT/US2016/056455, dated Dec. 9, 2016, 17 pages.

* cited by examiner

SYSTEMS AND METHODS FOR SERVING PIXEL MAPPED CONTENT TO MERCHANDISING COMMUNICATION SYSTEMS

CROSS REFERENCE TO RELATED APPLICATIONS

The present application is a continuation of application Ser. No. 15/436,645, entitled SYSTEMS AND METHODS FOR SERVING PIXEL MAPPED CONTENT TO MERCHANDISING COMMUNICATION SYSTEMS, filed Feb. 17, 2017, which is a continuation of application Ser. No. 15/140,416, entitled SYSTEMS AND METHODS FOR SERVING PIXEL MAPPED CONTENT TO MERCHANDISING COMMUNICATION SYSTEMS, filed Apr. 27, 2016, which claims the benefit of priority under 35 U.S.C. § 119(e) of Provisional Application No. 62/240,456, entitled SYSTEMS AND METHODS FOR SERVING PIXEL MAPPED CONTENT TO MERCHANDISING COMMUNICATION SYSTEMS, filed Oct. 12, 2015, the content of which is hereby incorporated by reference in its entirety for all purposes. The present application is related to U.S. application Ser. No. 15/140.374, entitled LED RETAIL DIGITAL SIGNAGE, filed Apr. 27, 2016, and to U.S. application Ser. No. 14/815,784, entitled DYNAMIC MERCHANDISING COMMUNICATION SYSTEM, filed Jul. 31, 2015, U.S. patent application Ser. No. 14/815,760, entitled Merchandising Communication and Inventorying System, filed Jul. 31, 2015, U.S. patent application Ser. No. 14/815,745, entitled System and Methods for Serving Content to Merchandising Communication Systems, filed Jul. 31, 2015, and U.S. patent application Ser. No. 14/815,723, entitled Systems and Methods for Serving Content to Merchandising Communication Systems Based on External Events, filed Jul. 31, 2015, each of which are incorporated herein by reference in their entireties.

FIELD

The disclosure relates to systems and methods for merchandising, particularly within retail settings.

BACKGROUND

There are a variety of retail options for displaying a variety of information in retail environments, including, pricing, labeling, promotions, etc. Traditionally, this information has been provided using print systems, including slide-in paper system, plastic label systems, adhesive label systems, etc. More recently, there has been increased interest in utilizing digital or electronic communication systems to display such information.

SUMMARY

In one aspect the present disclosure relates to merchandising communication systems configured to display, and methods for displaying, pixel-mapped content (e.g., pixel mapped barcodes and text) in retail environments. In some instances, pixel mapping of content may improve the functional capabilities of the merchandising communication system. For example, in some instances, pixel-mapping of barcodes allows such barcodes to be efficiently read by barcode readers, pixel-mapping of text allows facile reading of text (e.g., minimizes blurriness, and/or other sub-optimal presentation of the text). In some embodiments, the system comprises digital signage, such as at least one display unit comprising a viewable pixel array (e.g., light emitting diode (LED) pixel array).

Generally, such systems comprise one or more physical processors configured by machine-readable instructions. In specific instances, such instructions are configured to identify a product or message associated with the digital display, the product or message associated with the digital display being advertised on the digital display, or otherwise associated therewith. In various embodiments, identification of the product may be identification of a product itself associated with the digital display, or may be identification of content associated with a product, which content is associated with the digital display. In some embodiments, the message may be associated with a promotion associated with a digital display (e.g., a message about a contest associated with the display or a product associated therewith). In further or alternative embodiments, such instructions are configured to generate pixel mapped content associated with a product or message. In specific embodiments, pixel mapped content is displayed on an array of pixels associated with the digital display. In more specific embodiments, pixel mapped content comprises an array of pixels, wherein each pixel is configured to be in an "on" or an "off" setting. In further or alternative embodiments, the instructions are configured to effectuate communication of the pixel mapped content to the digital display. In further specific embodiments, the instructions and system are configured such that the pixel mapped content is displayed on the array of pixels of the digital display, or a portion thereof.

As discussed herein, the pixel mapped content includes any suitable content, preferably content that is unable to be properly or efficiently displayed using other content formatting techniques (e.g., using images, standard text fonts, etc.), particularly on display systems with larger pixel pitches (e.g., greater than 1 mm, or greater than 1.5 mm). In some instances, the pixel mapped content is a barcode. Any barcode that is able to be configured using display systems described herein is optionally utilized. In some instances, the barcode is a matrix barcode, such as a quick response code (QR code), Aztec Code, or the like, or a linear barcode. In some instances, a barcode may take up any suitable number of pixels on the display. For example, in some instances, a QR code is displayed on an array of pixels having a size of at least 21×21 (e.g., 25×25 or 29×29). More complex barcode systems may require larger arrays, whereas less complex barcode systems may use smaller arrays.

In instances wherein pixel mapped barcodes are displayed, additional system functionality and components are optionally utilized, such as to read such barcodes. In some instances, the system further comprises a barcode reader, or other computing platform configured to effectuate reading of the pixel mapped barcode. In exemplary embodiments, such a barcode reader or other computing platform is associated with a customer, i.e., the computing platform being operated by a customer. In some instances, a computing platform associated with a barcode reader is configured to effectuate presentation of a user interface associated with the barcode at a customer computing platform device. In specific instances, the user interface is displayed in a web browser, mobile app, or the like. In more specific instances, the barcode is configured to direct the computing platform to a specific website or uniform resource locator (URL), whereupon the user interface is displayed. The user interface is optionally configured in any desired manner, such as by being configured to display information about a product or message associated with the barcode, configured to allow the customer to electronically purchase the product associated with the barcode, and/or any other display any other information (e.g., access information about and/or enter a contest). In addition, the computing platform (e.g., associated with a customer, or with a store employee, etc.) is optionally further configured to send a purchase request for the product from the customer computer platform device to the retailer (e.g., a purchasing server associated with the retailer). Further, systems provided herein may be configured to receive a purchase request for the product from a customer user interface associated with the barcode and the product, and/or send a purchase fulfillment request (e.g., associated with the purchase request) to a purchase fulfillment server (e.g., whereupon a retailer or affiliate thereof with access to the fulfillment server arranges fulfillment of the purchase request).

Other system components are also optionally present. For example, in some instances, a system provided herein further comprises electronic storage configured to store information about the pixel mapped content and the product associated therewith, and wherein the one or more physical processors is further configured by machine-readable instructions to read the pixel mapped content from the electronic storage prior to effectuating communication of the pixel mapped content to the digital display. In some instances, the system comprises a module configured to identify an image previously associated with a product, and generate a pixel mapped content based on the identified image.

In certain embodiments provided herein are also methods of serving pixel mapped content to merchandising communication systems. Disclosures of method steps herein are to be understood as alternatively and optionally describing system configurations, where applicable, describing method steps. In specific instances, provided herein is a method of serving pixel mapped content to a merchandising communication system associated with a retail environment, the method being implemented in a computer system comprising one or more physical processors and storage media storing machine-readable instructions. In some instances, the method comprises identifying a product associated with a digital display of the merchandising communication system, the product associated with the digital display being advertised on the digital display, or otherwise associated therewith. In further or alternative instances, the method comprises generating a pixel mapped content associated with the product, the pixel mapped content comprising a plurality of content pixels, each pixel being configured to be in an on, or an off, setting. In still further or alternative embodiments, the method comprises effectuating communication of the pixel mapped content to the digital display, such that the pixel mapped content is displayed on the array of pixels of the digital display, or a portion thereof. In yet further or alternative embodiments, the method comprises reading the pixel mapped content from an electronic storage prior to effectuating communication of the pixel mapped content to the digital display; and/or identifying an image previously associated with the product, and generating a pixel mapped image (i.e., content) based on the identified image.

In certain embodiments, the pixel mapped content is a pixel mapped barcode. In specific embodiments, a method provided herein comprises reading a pixel mapped barcode, such as with a computing platform device, or a barcode reader associated therewith. In certain instances, upon reading of the pixel mapped barcode displayed on the array of pixels of the digital display, or a portion thereof, the method further comprises effectuating presentation of a user interface on a computing platform device (e.g., associated with the barcode reader, and, for example, a retail customer). In various embodiments, the user interface being configured to display information about the product, allow a user to select criteria for purchasing the product, or display other information and/or be configured to receive other inputs. In certain embodiments, the method further comprises receiving a purchase request for the product sent by the customer computer platform device, and/or sending a shipping request to a purchase fulfillment server.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Provided in certain embodiments herein are systems and processes for serving pixel mapped content to one or more merchandising communication system. In certain embodiments, use of pixel mapped content allows users to overcome functional difficulties, impracticalities, and impossibilities in utilizing such merchandising communication systems. For example, in systems using display units having a larger pixel pitch (the average distance center-to-center of adjacent pixels of an array), such as about 1.5 mm or more, certain content can be defective upon display. For example, when the non-pixel mapped content comprises a barcode, defective barcodes are displayed, resulting in errors in reading or an inability to read the barcode. In further examples, when content comprises non-pixel mapped text, blurry or otherwise non-aesthetically pleasing text is displayed.

Figure 1:
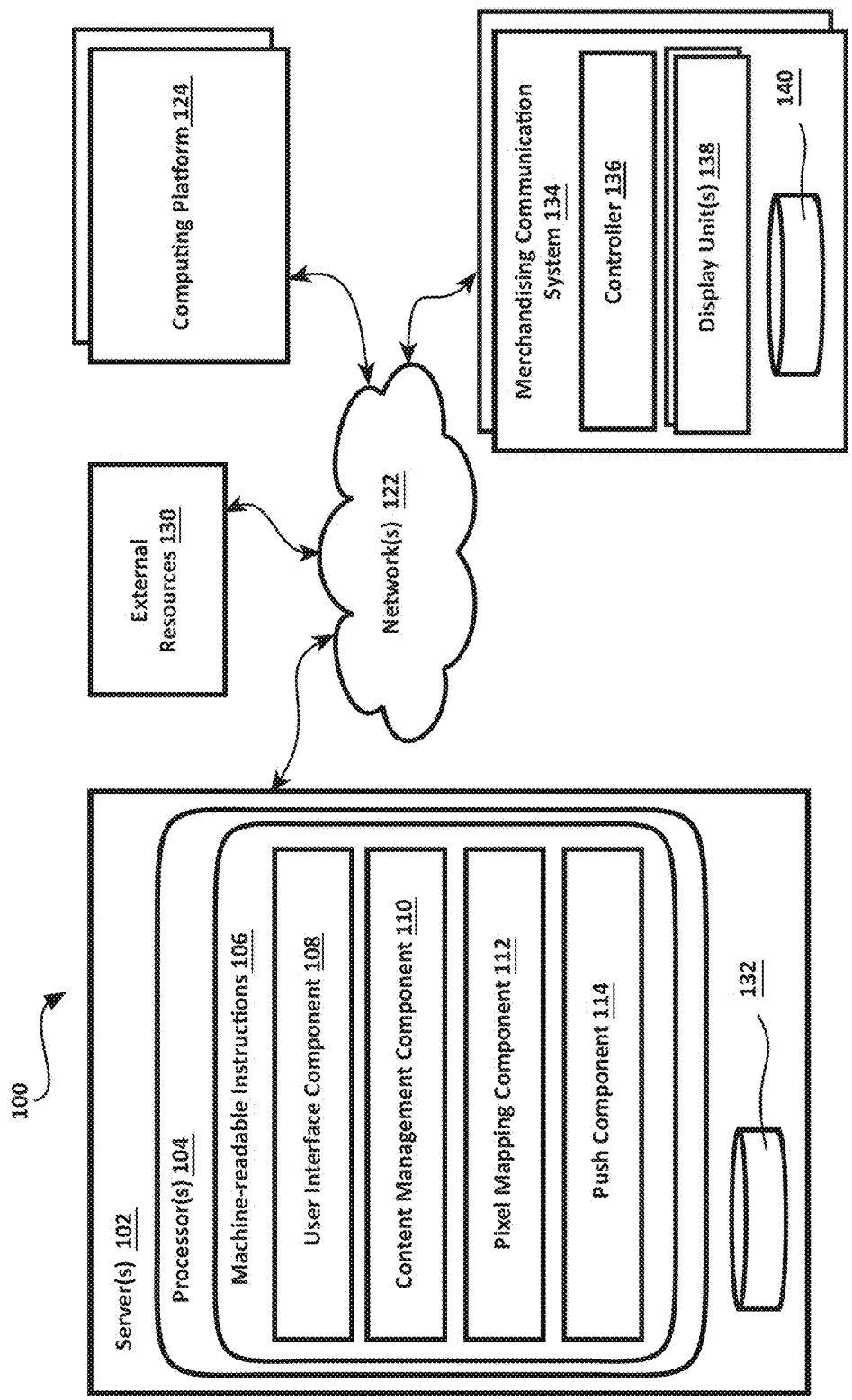
FIG. 1 illustrates an exemplary system provided herein configured for serving pixel mapped content to one or more merchandising communication system.

FIG. 1 illustrates an exemplary system 100 provided herein configured for serving content to one or more merchandising communication system 134. In some embodiments, a system 100 provided comprises one or more server 102 (e.g., a global content server, a purchasing server, and/or the like), one or more merchandising communication system(s) 134, one or more external resource(s) 128, and/or other components. In some embodiments, a system 100 further comprises a computing platform 124. Server(s) 102, communication system(s) 134, external resource(s) 130, and/or other components (e.g., computing platform(s) 124) may be communicatively coupled via one or more networks 122.

Network 122 may include the Internet, Intranets, near field communication, frequency (RF) link, Bluetooth®, Wi-Fi, and/or any type(s) of wired or wireless network(s). It will be appreciated that this is not intended to be limiting and that the scope of this disclosure includes implementations in which the server(s) 102, computing platform(s) 124, merchandising communication system(s) 134, external resource(s) 130, and/or other components may be operatively linked via some other communication media.

Server(s) 102 may be configured to communicate content to individual merchandising communication systems 134 and/or sets of merchandising communication systems 134. In specific embodiments, the content is or comprises pixel mapped content. In some instances, the pixel mapped content is a barcode, text, or other type of content. In certain embodiments, the content that is associated with one or more of product information (e.g., labeling, nutritional facts, and/or other information), sales information (e.g., pricing, promotional incentives, rebates, and/or other information), and/or other types of information that may be presented to users. Within individual merchandising communication systems 134, content may be provided to one or more individual display unit 138, the content being displayed to each display unit 138 optionally being the same or different. In some instances, content is provided to multiple display units 138 as global display information that comprises all content for the merchandising communication system 134, with a subset of that content (herein referred to as local display information, such as a subset of the global display information) being received by, and presented at, individual display unit(s) 138 of the merchandising communication systems 134. Further details of systems and methods for providing and displaying content to the display unit(s) 138 are described in co-pending U.S. patent application Ser. No. 14/815,784, entitled "Dynamic Merchandising Communication System," filed on Jul. 31, 2015, U.S. patent application Ser. No. 14/815,760, entitled "Merchandising Communication and Inventorying System," filed Jul. 31, 2015, U.S. patent application Ser. No. 14/815,745, entitled "System and Methods for Serving Content to Merchandising Communication Systems," filed Jul. 31, 2015, and U.S. patent application Ser. No. 14/815,723, entitled "Systems and Methods for Serving Content to Merchandising Communication Systems Based on External Events," filed Jul. 31, 2015, each of which are incorporated herein by reference in their entireties.

The computing platform(s) 124 may include one or more processors configured by machine-readable instructions to execute computer program components. The computer program components may be configured to enable one or more users associated with the computing platform(s) 124 to interface with system 100, server(s) 102, one or more other computing platforms 124, one or more merchandising communication systems 134, external resource(s) 130, and/or other components. By way of non-limiting example, computing platform(s) 124 may include one or more of a desktop computer, laptop computer, handheld computer, NetBook, tablet, Smartphones, Smartwatch, PDA, cellular telephone, PCs, and/or other computing platforms.

Computing platform(s) 124 may include one or more physical interfaces and/or other components. A physical interface included in computing platform(s) 124 may be configured to present one or more user interfaces (see, e.g., FIG. 5 and FIG. 6) to facilitate communication of information between server(s) 102, merchandising communication system(s) 134, external resource(s) 130, and/or other components and a user of computing platform(s) 124. By way of non-limiting example, a user may provide, via interactions with a given user interface, information to and/or receive information from global content server 102, one or more other computing platform(s) 124, merchandising communication system(s) 134, external resource(s) 130, and/or other components.

Examples of physical interface devices of computing platform 124 include one or more of a keypad, buttons, switches, a keyboard, knobs, levers, a display screen, a track pad, a touch screen, speakers, a microphone, an indicator light, an audible alarm, a printer, and/or other interfaces through which a user may provide and/or receive information. It is to be understood that other communication techniques, either hardwired or wireless, are also contemplated by the present invention as a physical interface of the computing platform(s) 124. As such, one or more other techniques for communicating information between one or more components of system 100 are contemplated by the present disclosure as a physical interface of computing platform(s) 124.

Exemplary information provided to the server(s) 102 (and/or other components of system 100) from the computing platform(s) may include parameter values of one or more content communication parameters, and/or other information. Parameter values of one or more content communication parameters (e.g., content type, specific product selection, location at which the content is to be displayed, etc.) may facilitate selective communication of global display information from global content server 102 to individual merchandising communication systems 134 and/or sets of merchandising communication system(s) 134.

Exemplary information provided to a physical interface of computing platform(s) 124 from global content server 102 (and/or other components of system 100) may include feedback information, and/or other information. Feedback information may facilitate generation and/or dissemination of performance reports for individual merchandising communication systems 130. Information about content selection options may facilitate the selection of specific content to be displayed on individual merchandising communication systems.

In some implementations, a given merchandising communication system 134 may comprise one or more of a controller 136, one or more display units 138, electronic storage 140, and/or other components and/or systems configured for presenting content to users in retail and/or other settings. A single controller 136 is illustrated in FIG. 1 comprising one or more components, however, several controller subunits and/or other components may be combined to serve the function of controller 136. In some implementations, controller 134 may comprises one or more processors configured by machine-readable instructions, a sending card, and/or other components. In some implementations, sending card may be configured to perform one or more of: receiving display information (e.g., as sent from server(s) 102 over network 122); providing the display information to one or more display units 138, and/or other operations.

In some implementations, controller 136 may be configured to monitor individual display units and/or other components of a merchandising communication system to determine working conditions of the components. By way of non-limiting example, monitoring may include detecting hardware and/or software malfunctions, monitoring time between routine services required for a given component, and/or other types of monitoring to determine working conditions of components of a merchandising communication system.

In some implementations, electronic storage 140 of merchandising communication system 134 may be configured to store received content (e.g., display content/information). Such storage may facilitate continued performance of the merchandising communication system 134 should communications with global content server 102 be inhibited. By way of non-limiting example, by storing received content, merchandising communication system 134 may be able to function appropriately in the event that one or both of global content server 102 and/or network 122 cease to function appropriately (e.g., loss of network connectivity).

Figure 2:
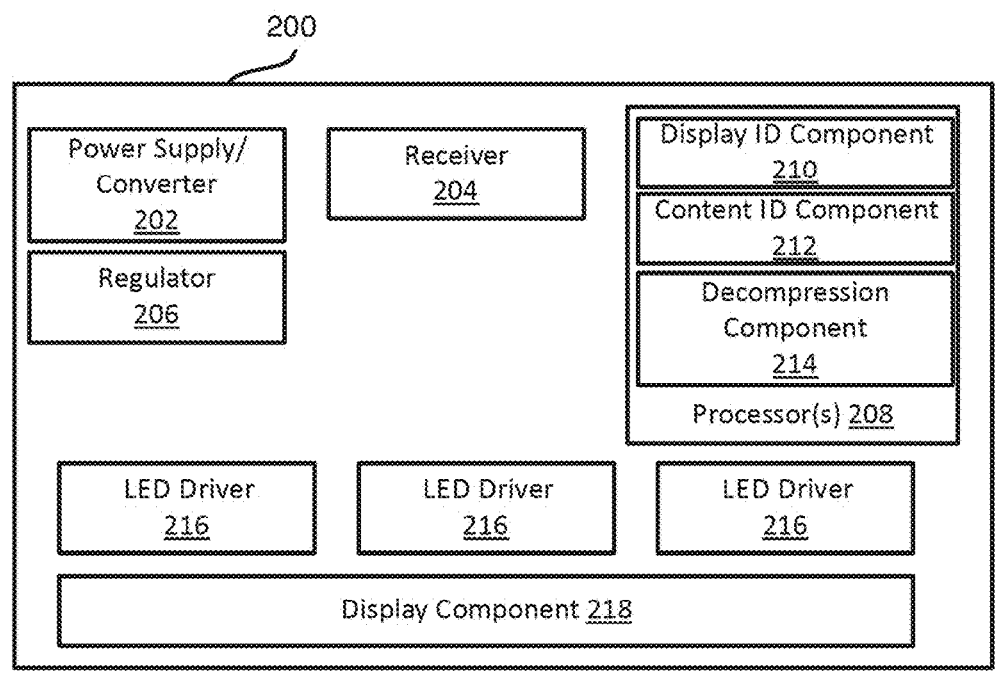
FIG. 2 illustrates an exemplary display unit used in a merchandising system described herein.

FIG. 2 illustrates an exemplary display unit 200. The display unit 200 may be configured receive power in a power input (not shown) and display information in a second input (e.g., receiving compressed display information). The display unit 200 may comprise a power supply 203 (e.g., converting AC power to DC power) connected to the power input, and a power regulator 206 connected to the power supply 202 and configured to provide a suitable power source to one or more components of the display unit 200. The information input may be connected to a receiver (information receiver) 204. The display unit 200 may comprise one or more processors 208 configured by machine-readable instructions to execute one or more program components. Execution of the machine-readable instructions may cause the one or more processor 208 to identify local display information to be displayed on the display component 218 (e.g., an LED array and/or other display devices), provide the local display information to the display component 218 for presentation, and/or other operations. Optional LED drivers 216 may be included. In some embodiments, the computer program components may comprise one or more of a display identification component 210, a content identification component 212, a decompression component 214, and/or other components.

In some embodiments, digital displays provided herein are LED displays comprising an array of viewable LED pixels. In specific embodiments, the LED pixel comprises a red light emitting diode, a green light emitting diode, or a blue light emitting diode. In more specific embodiments, the LED pixel comprises a red light emitting diode, a green light emitting diode, and a blue light emitting diode. In certain embodiments, the light emitting diode is a light emitting diode chip. In specific embodiments, the LED display component comprising a conductive substrate (e.g., a printed circuit board (PCB) (e.g., a metal core printed circuit board (MCPCB))) comprising multiple light emitting diode chips mounted on or embedded in a substrate (e.g., using chip on board technologies). In preferred embodiments, the pixel pitch of any LED display or display unit provided herein is about 3.0 mm or less. In more preferred embodiments, the pixel pitch is about 2.5 mm or less. In yet other embodiments, the pixel pitch is about 2.0 mm or less. In yet more preferred embodiments, the pixel pitch is about 1.9 mm or less (e.g., about 1.875 mm).

In certain embodiments, the array of viewable LED pixels has a first number of pixels in the first dimension and a second number of pixels in a second dimension. In some embodiments, the first (height) dimension comprises about 24 pixels or more. In preferred embodiments, the first (height) dimension comprises about 30 pixels or more (e.g., about 32 pixels). In more preferred embodiments, the first (height dimension comprises about 30 to about 60 pixels. Generally, about 30 or more pixels are preferred to provide minimum desired display requirements, providing for at least a 27×27 QR barcode, and/or three lines of text with minimal visible text defect. Any suitable number of pixels is present in the second (length) direction. Pixel pitch in the second (length) dimension is preferably about the same as the pixel pitch in the dimension, the number of pixels being determined thereby and by the length of the display unit. In certain embodiments, the number of LED pixels in the second dimension is about 100 or more. In preferred embodiments, the number of LED pixels in the second dimension is about 100 to about 500, e.g., about 120 to about 200 or about 160. Other details about certain preferred LED displays are described in co-pending U.S. patent application Ser. No. 14/815,784, which is incorporated herein by reference in its entirety.

Figure 3:
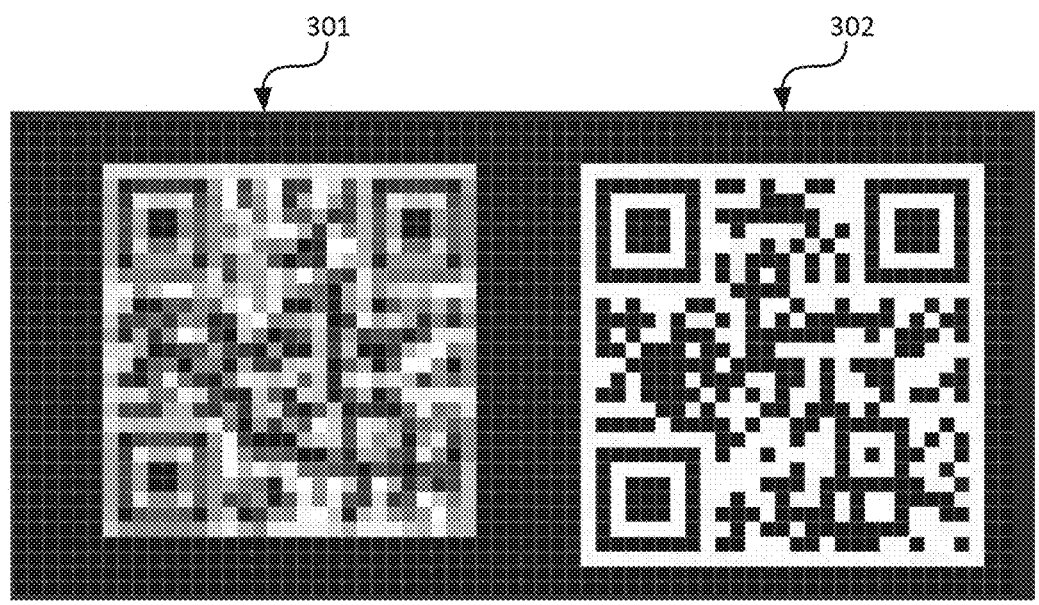
FIG. 3 illustrates an exemplary defective and non-functional barcode provided to a display unit of a merchandising communication system in a non-pixel mapped format (left panel) and an exemplary functional barcode provided to a display unit of a merchandising communication system in a pixel mapped format (right panel).

In some instances, communication of certain types of content over such systems results in a loss of resolution or in other defects in the displayed content when the content is ultimately displayed on the display unit(s) 138, 218. FIG. 3 illustrates the defects that may arise in displaying certain types of content (such as barcodes and text) using a system described herein. QR code 301 is generated on an LED display 138, 218 described herein, wherein the display content is provided to the display unit as an image. In some instances, due to the use of a system described herein, attempts to scan QR code 301 with a barcode reader fail because of excessive defects. Pixel mapped QR code 302 is properly displayed at the LED display 138, 218, however, with the use of a barcode reader thereof resulting in a proper response. Similarly, use of standard text content provided to display units result in defects that are visually not pleasing and may be difficult to read.

Returning to FIG. 1, electronic storage 132 of global content server 102 may be configured to store and/or otherwise access content (e.g., barcodes) available to be served to one or more merchandising communication systems 134, information that characterizes the available content (e.g., locations of products and/or display units associated with the content), information that characterizes individual ones of the merchandising communication systems (e.g., retail environment information, such as specific retailers and/or addresses associated with the content), and/or other information.

In some implementations, electronic storage 132 may store and/or otherwise access information that characterizes available content. Information that characterizes available content may include one or more of content type information (e.g., barcode or text), product specific information (e.g., URL(s) for accessing a user interface configured to display information about the product or purchasing the product from one or more retailer), and/or other information.

Retail environment identification information may include one or more of a name of the retail environment, location information, display unit layout information, and/or other information. Location information may comprise one or more of a GPS location, a country, state, city, address, and/or zip code associated with the retail environment, and/or other information. By way of non-limiting example, electronic storage 132 may store first retail environment information of a first retail environment associated with a first merchandising communication system. The first retail environment information may include, for example, a first name of the retail environment. By way of non-limiting example, a name may comprise one or more of Walmart®, Target®, and/or other retail environment name. In some instances, retail environment identification information is used, e.g., in combination with the product information, to identify and/or generate a proper barcode for scanning by a customer, such as a barcode that, upon being scanned, directs the customer (e.g., through a web browser) to a user interface that allows the customer user to access information about a product (e.g., associated with the barcode) and/or to purchase the product from the retailer associated with the particular retail environment in which the customer is located.

The content server 102 may include multiple servers, including, in some embodiments, one or more content servers, and one or more purchase servers. In some embodiments, the server(s) 102 comprise one or more physical processor 104 configured by machine-readable instructions 106.

In some embodiments, executing the machine-readable instructions 106 cause the one or more physical processor 104 to facilitate serving content (e.g., pixel mapped content described herein, such as barcodes and text) to one or more merchandising communication systems 134 associated with one or more retail environments. The machine-readable instructions 106 (e.g., of one or more content server(s)) may include one or more of a user interface component 108, one or more content management component 110, one or more pixel mapping component 112, one or more content pushing component 114, and/or other components.

A user interface component 108 may be configured to effectuate presentation of user interfaces at computing platforms 124 associated with users of system 100. A given user interface may include one or more user interface elements and/or other components. A user interface element may comprise one or more of an input element, a display element, a navigation element, and/or other elements. An input element may comprise one or more of a selectable element (e.g., virtual button), a text input box, a drop down menu, a check box, and/or other input elements. A display element may comprise a portion of a user interface configured to present information. A display element may comprise one or more of a window, a pop-up window, a status bar, and/or other display elements. A navigation element may be configured to facilitate user navigation between different pages, tabs, windows, and/or views of one or more user interfaces. A navigation element may include one or more of a scroll bar, a tab, a root menu, and/or other navigation element.

In some implementations, a given user interface may be configured to receive user entry and/or selection of parameter values for one or more content communication parameters, and/or other information. By way of non-limiting example, a given user interface may include one or more user interface elements configured to facilitate user entry and/or selection of parameter values. The user interface component may be configured to obtain the user entered and/or selected parameter values from computing platforms 124 based on user interaction with the user interface displayed on the computing platforms 124.

User-provided parameter values (e.g., selected using a user interface for one or more content server(s)) for one or more content communication parameters (e.g., selection of product, retailer, retail location, display location, website associated with a particular product and retailer, text to be displayed, content to be displayed, and the like) may facilitate selective communication of content (e.g., which barcode and/or text) to one or more merchandising communication systems 134, and/or the display unit(s) thereof 138.

In some embodiments, content management component 110 is configured to associate content with one or more merchandising communication systems 134 or display units 138, thereof In some instances, the association of content with the specific merchandising communication system 134 or display unit 138 thereof is based on user- provided parameter values for one or more content communication parameters (e.g., associating a barcode based on product location and URL associated with the product and/or product location (or, e.g., a barcode based on a message location and URL associated with information about and/or entering a contest, such as to win a product); or associating text with a product and/or product location). Association of content with the user-provided parameter values may comprise one or more of determining matches between the user-provided values and available content (e.g., barcodes stored in electronic storage 132), generating content (e.g., a barcode) based on the user-provided values, and/or other techniques.

By way of non-limiting example, the user-provided parameter values may be a product parameter related to a product name. The user-provided parameter value may be "Count Chocula Cereal." The content may include, for example, a barcode (e.g., QR barcode) that directs the customer (e.g., through a web browser) to a user interface that allows the customer user to access information about a product (e.g., associated with the barcode) and/or to purchase the product from the retailer associated with the particular retail environment in which the customer is located. In exemplary embodiments, the user provided parameter values include a first selection of a product name, such as "Count Chocula Cereal," a second selection of a retailer, such as WalMart®, and/or a or merchandising system, such as Target® Store 10, and a third selection of a URL of a web address that provides a user interface that displays information related to the product (for example, nutritional details and/or promotions for "Count Chocula Cereal") and/or purchase options for the product (for example, availability of the product at nearby stores and/or an interface allowing online purchase of the product). In further embodiments, the user-provided parameter value includes text entered, such as the name of the product, the price of the product, and/or any other information related to the product or promotions, such as those run in connection with the product.

In some implementations, content management component 112 may configure content based on specifics of a merchandising communication system 134 with which the content is to be communicated (e.g., determined by a merchandising communication system management component (not shown)). By way of non-limiting example, content (may be configured based one or more of the components of an intended recipient merchandising communication system 134, layout of the components of the recipient merchandising communication system 134 (e.g., locations of display units where local display information is intended to go), and/or other criteria.

In some instances, content associated with the user provided parameter value(s) is stored on electronic storage 132. In some embodiments, such content includes text, barcodes, and the like. In further or alternative embodiments, content, such as a barcode, is generated based on the user parameter value(s) provided. For example, in some instances, barcode content is generated based on user parameter value(s) provided. In other examples, text content is provided as a user provided parameter value, along with other optional user provided parameter value(s).

In certain instances, pixel mapping component 112 generates or retrieves (e.g., retrieves pixel mapped content that was previously generated, and, optionally, stored on electronic storage 132) pixel mapped content based on the user parameter value(s) provided. In some embodiments, non-pixel mapped content is identified and/or generated based on the user provided parameter value(s), and pixel mapped content is subsequently generated based on the previously identified and/or generated non-pixel mapped content. For example, in some instances, (i) based on the identification of a product, a retail identifier, and/or a URL associated with the product and/or retail identifier, a barcode image (e.g., QR code) is generated; and (ii) based on the barcode image, a pixel mapped barcode is generated (e.g., and pushed to and/or displayed on a merchandising communication system 132 of the system 100). In further examples, in some instances, (i) a user parameter value provides text content (e.g., the text content being in a standard or non-pixel mapped format); and (ii) based on text content, pixel mapped text content is generated (e.g., and pushed to and/or displayed on a merchandising communication system 132 of the system 100). In other examples, in some instances, (i) based on user parameter values provided, such as identification of a product and/or a retail identifier, non-pixel mapped text content is retrieved (e.g., from an electronic storage device 132); and (ii) based on non-pixel mapped text content, pixel mapped text content is generated (e.g., and pushed to and/or displayed on a merchandising communication system 132 of the system 100).

In some instances, pixel mapping of content comprises generating display content wherein the pixels of the display content are configured in either an "on" or an "off" position. In some embodiments, pixels configured to be in an "on" position are of similar brightness (e.g., each pixel in the "on" configuration is configured to be within 50% or within 25% or within 10% of the brightness (e.g., in lumen) of the average "on" pixel brightness of the content) and/or color (e.g., white). Similarly, in certain embodiments, pixels configured to be in an "off" position are of similar brightness (e.g., each pixel in the "off" configuration is configured to be within 50% or within 25% or within 10% of the brightness (e.g., in lumen) of the average "off" pixel brightness of the content) and/or color.

Push component 114 may be configured to effectuate communication of pixel mapped content (e.g., associated with user-provided parameters values (e.g., as determined by content management component (not shown))) to determined individual merchandising communication systems 134 and/or sets of merchandising communication systems 134 (e.g., as determined by a merchandising communication system management component (not shown)). In some implementations pixel mapped content communicated to individual merchandising communication systems 134 may be configured specifically for the individual merchandising communication system 134 (e.g., based on the specifics of the components of the merchandising communication system 134, layout of the merchandising communication system 134, and/or other criteria). Push component 114 may be configured to effectuate communication of content to the appropriate receiving merchandising communication system 134, and/or display unit(s) 138 thereof. By way of non-limiting example, push component 114 may be configured to effectuate first pixel mapped content to a first merchandising communication system. In further examples, push component 114 may be configured to effectuate first pixel mapped content to a first merchandising communication and second pixel mapped content to a second merchandising communication. In some embodiments, the first pixel mapped content is a first pixel mapped barcode configured to provide display of a first user interface configured to display information from a first retailer associated with a first product (e.g., when scanned with a computing platform—on which the first user interface is displayed), and the second pixel mapped content is a second pixel mapped barcode configured to provide display of a second user interface configured to display information from a second retailer associated with either the first product or a second product (e.g., when scanned with a computing platform—on which the second user interface is displayed).

Figure 4:
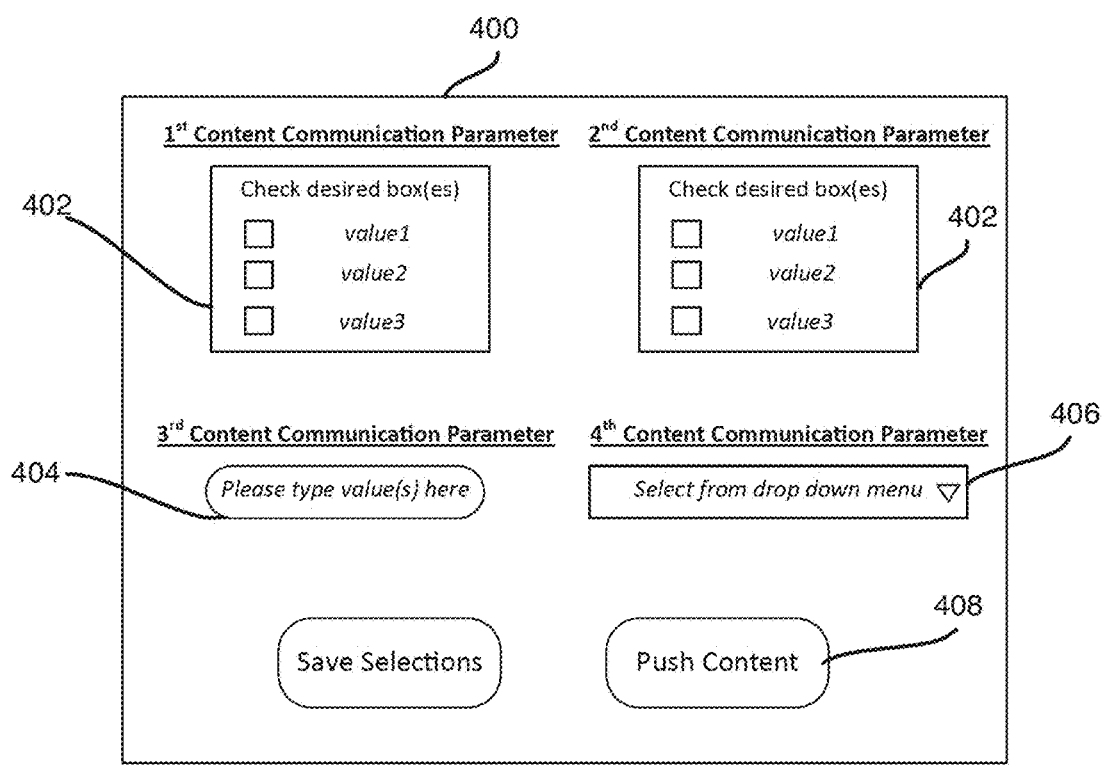
FIG. 4 illustrates an exemplary user interface configured to receive user entry and/or selection of parameter values for one or more content communication parameters.

FIG. 4 illustrates an exemplary user interface 400 configured to receive user entry and/or selection of parameter values for one or more content communication parameters. User interface 400 may be presented on a display of a computing platform associated with a user of the system 100 (FIG. 1). User interface 400 may include one or more user interface elements configured to facilitate user entry and/or selection of parameter values. By way of non-limiting example, user interface 400 may include one or more of input elements 402, 404, 406, 408, and/or other user interface elements. Input elements may comprise one or more of check boxes 402, text input fields 404, drop down menu 406, selectable buttons 408, and/or other input elements. In some implementations, individual input elements may be associated with one or more content communication parameters for which a user may specify a parameter value. For example, as illustrated, user interface 400 may be configured to facilitate user entry and/or selection of parameter values for one or more of a first content communication parameter, a second content communication parameter, a third content communication parameter, a fourth content communication parameters, and/or other parameters. One or more of the parameters may comprise content selection parameters. One or more of the parameters may comprise merchandising communication system selection parameters. One or more input elements (e.g., input element 408) may facilitate user submission of entered and/or selection of parameter values to effectuate serving of appropriate content to appropriate merchandising communication systems.

It is noted that the depiction in FIG. 4 and accompanying descriptions are provided for illustrative purposes only and are not to be considered limiting. For example, in some implementations, a user interface may be configured to facilitate user entry and/or selection of more or fewer content communication parameters.

Figure 5:
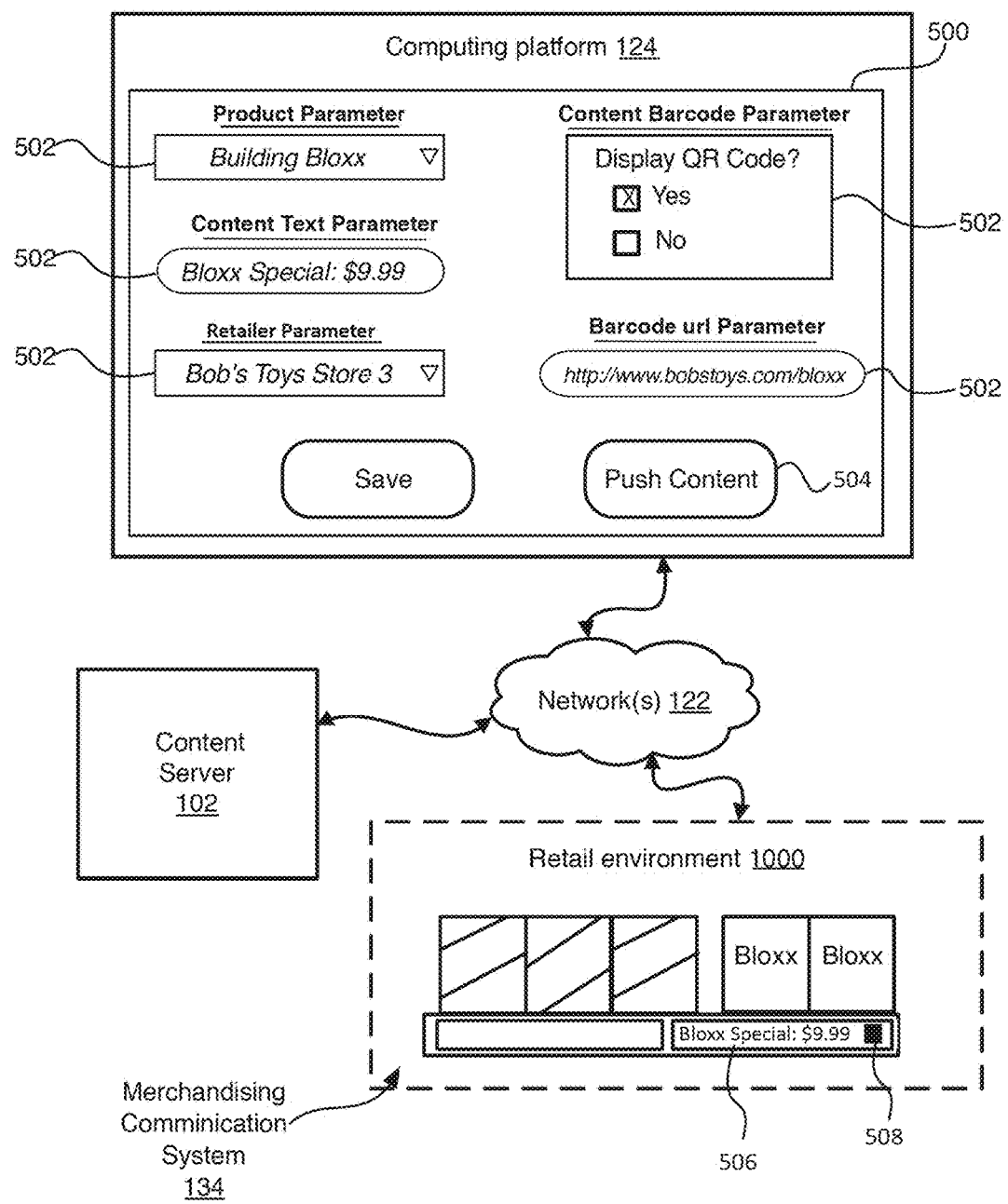
FIG. 5 illustrates an exemplary implementation of system configured to serve pixel mapped content to one or more merchandising communication systems.

FIG. 5 illustrates an exemplary implementation of system 100 configured for serving pixel mapped content to one or more merchandising communication systems. System 100 as shown includes one or more of content and pixel mapping server 102, computing platform 124, merchandising communication system 134 within retail environment 1000, and/or other components. Content server 102, computing platform 124, merchandising communication system 134, and/or other components may communicate via network 122.

Computing platform 124 may be configured to display a user interface 500. User interface 500 may be configured to receive user entry and/or selection of parameter values for one or more content communication parameters. By way of non-limiting example, the content communication parameters of user interface 500 may include one or more of a (e.g., a merchandising communication system selection parameter such as) product parameter, content text parameter, content barcode parameter, retailer parameter, URL parameter, and/or other parameters. Any one or more of these parameters is alternatively pre-associated with a product and/or retailer and stored by the server 102, or an electronic storage thereof 132. For example, in some instances, with the input of a product parameter and/or a retailer parameter, the server may be configured to automatically associate a barcode and/or URL with the product and/or retailer (e.g., such barcode and/or URL being stored on electronic storage 132 of the server 102, or retrieving such a barcode and/or URL from the retailer) and to automatically display a pixel mapped barcode associated with the URL and the product at a display unit associated with the product and retailer.

User interface 500 may include one or more user interface elements. By way of non-limiting example, user interface 500 may include input elements 502 configured to receive user entry and/or selection of parameter values for the various parameters, input parameters 504 configured to receive user input to effectuate serving of content to one or more merchandising communication systems. For example, input elements 502 may comprise sets of check boxes, pull down menus, text inputs, and/or other input elements.

For illustrative purposes, one or more parameter values are shown as being selected by a user of computing platform 124. The parameter values may facilitate selective serving of pixel mapped content to merchandising communication system 134 in accordance with one or more implementations of system 100 described herein. By way of non-limiting example, the current selections as shown may facilitate serving pixel mapped content (e.g., pixel mapped text and barcodes as illustrated) to retail environments, such as "Bob's Toys" at a specific "Store 3" location. The content to be served includes a pixel mapped text 506 to be served, exemplarily illustrating the product name and price, and the fact that the price is a special. However, any other entered or pre-selected pixel mapped text is alternatively or additionally displayed. Further, a pixel mapped barcode 508 (e.g., QR code) is displayed, which upon being scanned by a (e.g., customer) computing platform (not shown) comprising a barcode reader, such as a camera, to display a user interface on the computing platform displaying information about and/or purchase options for the product ("Building Bloxx" in the illustration).

Figure 6:
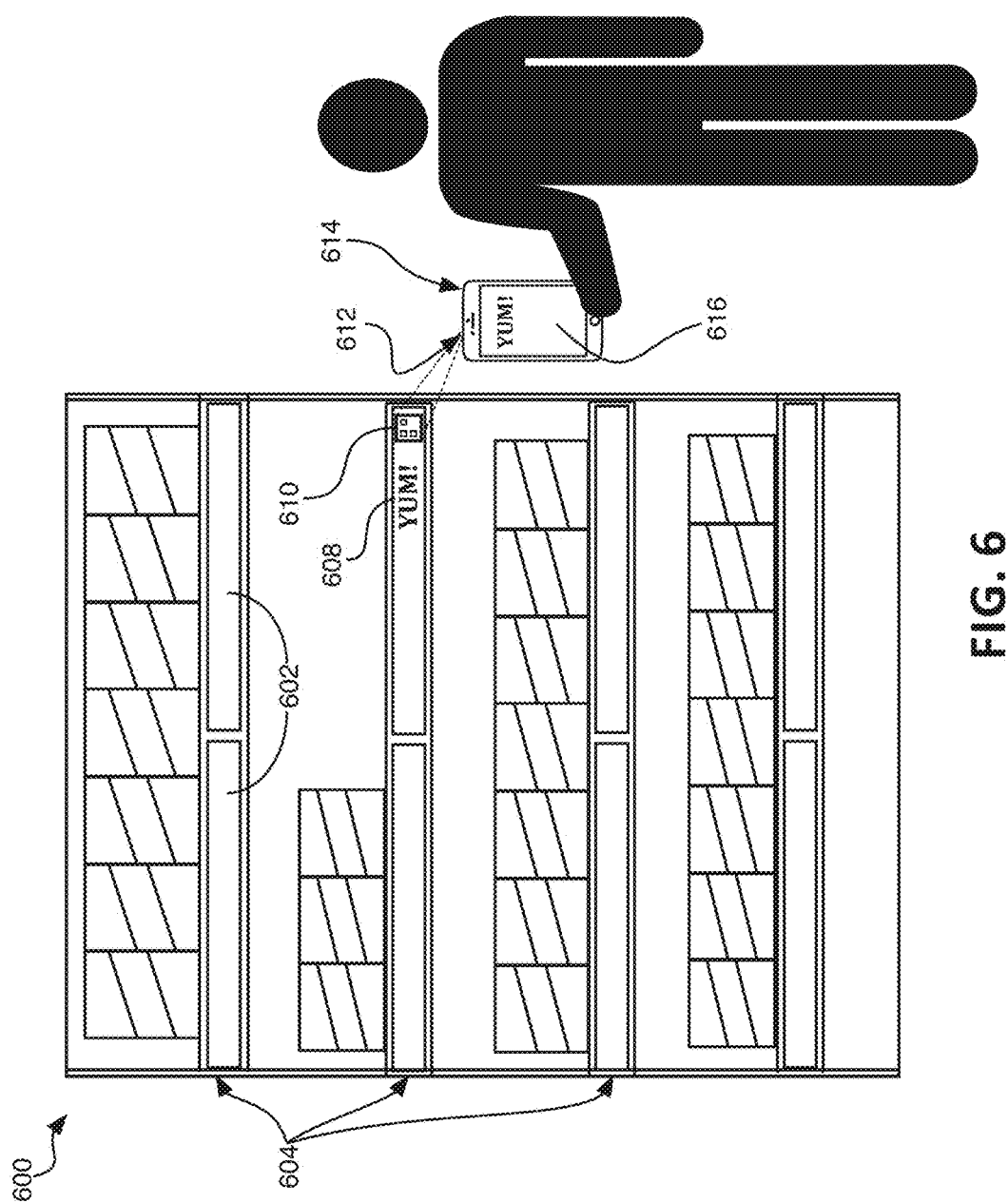
FIG. 6 illustrates an exemplary implementation of a merchandising communication system in a retail setting.

FIG. 6 illustrates an exemplary implementation of a merchandising communication system 600 in a retail setting comprising one or more display units 602 and/or other components described herein. The display units 602 may be affixed to and/or integrated with retail shelving 604. The display units 602 may be configured to provide specific pixel mapped display content for individual products 606 on the shelves 604. Illustrative pixel mapped content that may be displayed on the display units 602 of the merchandising communication system 600 include pixel mapped text 608, pixel mapped barcodes 610, and/or other types of content. In some instances, pixel mapping of certain content, such as text 608 and barcodes 610, improves the experience of a customer, or other person, in proximity to a display unit 602 of the merchandising system 600. For example, in some instances, pixel mapping of text reduces text defects, and renders the text more readable and/or less "blurry." In further examples, in some instances, pixel mapping of barcodes (e.g., QR barcodes) renders the barcodes 610 readable by a barcode reader 612. In some instances, systems provided herein comprise a computing platform 614 configured to, e.g., upon scanning of a barcode 610, display a user interface 616 that is configured to display the product or purchasing the product from one or more retailer), and/or other information. In some instances, for example, the computing platform 614 is configured to open and display a user interface 616 (e.g., a web browser or other computing application) that will access a network and a store of data regarding a product associated with the barcode, such as information about product inventory, product details, and/or other information.

Figure 7:
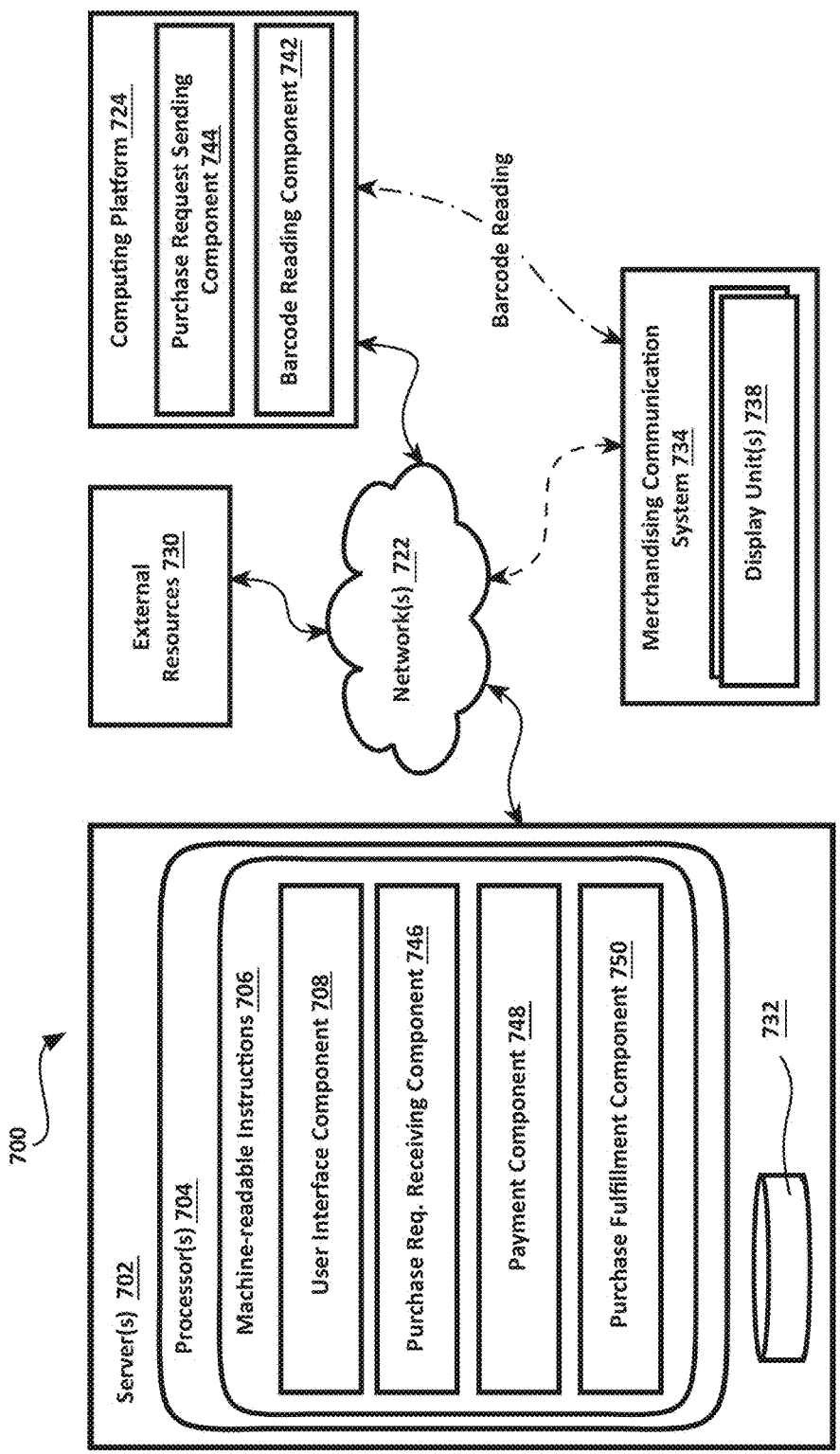
FIG. 7 illustrates an exemplary downstream system or system part that may be used with the delivery of pixel mapped barcode content to a merchandising communication system provided herein.

FIG. 7 illustrates that in certain embodiments, a system 700 provided herein comprises a computing platform 724 (e.g., a customer computing platform) comprising a barcode reading component 742, a purchase request sending component 744, and/or other components. In some instances, the barcode reading component 742 is configured to read a pixel mapped barcode displayed on a display unit 738 of a merchandising communication system 734 provided herein. Further, in certain embodiments, upon reading the pixel mapped barcode, the computing platform is configured to display a user interface displaying information about a product associated with the barcode (e.g., price, ratings, reviews, manufacturer's details, information about availability—such as other locations affiliated with the retailer in which the merchandising communication is located, and/or other information), displaying product purchase information (e.g., purchase inputs, such as purchase quantities, payment information, billing information, shipping information, pick-up information, and/or other information), and/or other information.

The machine-readable instructions 706 (e.g., of one or more content server(s)) may include one or more of a user interface component 708, one or more purchase request receiving component 746, one or more payment processing component 748, one or more purchase fulfillment component 750, and/or other components.

A user interface component 708 may be configured to effectuate presentation of user interfaces at computing platforms 724 associated with users of system 700. A given user interface may include one or more user interface elements and/or other components. A user interface element may comprise one or more of an input element, a display element, a navigation element, and/or other elements. An input element may comprise one or more of selectable element (e.g., virtual button), a text input box, a drop down menu, a check box, and/or other input elements. A display element may comprise a portion of a user interface configured to present information. A display element may comprise one or more of a window, a pop-up window, a status bar, and/or other display elements. A navigation element may be configured to facilitate user navigation between different pages, tabs, windows, and/or views of one or more user interfaces. A navigation element may include one or more of a scroll bar, a tab, a root menu, and/or other navigation element.

In some implementations, a given user interface may be configured to receive user entry and/or selection of parameter values for one or more content communication parameters, and/or other information. By way of non-limiting example, a given user interface may include one or more user interface elements configured to facilitate user entry and/or selection of parameter values. The user interface component may be configured to obtain the user entered and/or selected parameter values from computing platforms 724 based on user interaction with the user interface displayed on the computing platforms 724. User-provided parameter values (e.g., selected using a user interface for one or more purchase server(s)) for one or more purchase parameters (e.g., selection of product, quantity of product, delivery or pick-up option, and the like) may facilitate purchase of a product (e.g., a product that is out of stock, that a customer would like to have delivered, or the like).

Information about purchase values that are optionally input into user interface of the computing platform 724 (e.g., type of product, quantity of product, location of shipment and/or pick-up, etc.) may facilitate the purchase (e.g., electronic purchase) of a product, such as when the item is out of stock, but is available at a nearby retail location (e.g., for pick-up) or online (e.g., for shipment to the retail location of the system, to a customer residence, or other location).

Purchase information may facilitate the purchase of a product by a customer, such as when the customer is unable or unwilling to purchase the product at the retail location, such as the item is out of stock, the item is too large to carry or transport, etc. Location information may facilitate a retailer identifying the location of a customer, and, thereby, facilitating the identification of availability of a product at the location and nearby retail locations. Other information may facilitate informing a customer about a product, such as by communicating labeling, nutritional facts, pricing, promotional incentives, rebates, and/or other information to computing platform 724 (e.g., being displayed on an interface thereof).

Purchase request receiving component 746 may be configured to receive a purchase request sent by a purchase request sending component 744 of a computing platform 724 (e.g., via network 722). Payment processing component 748 may be configured to access an external resource 730 (e.g., a brokerage) to check payment information and/or facilitate transfer of funds from a user (e.g., an account of a financial institution associated with the user, such as an account input into the user interface of computing platform 724) of computing platform 724, e.g., to a retailer associated with merchandising system 734. Further, the purchase fulfillment component 750 may be configured to confirm transfer of adequate funds from user to retailer, send instructions to fulfill a user purchase (e.g., send instructions to ship a product to an address associated with the user of computing platform 724, such as input by the user into the user interface of the computing platform 724). Electronic storage 732 of global content server 702 may be configured to store and/or otherwise access product information (e.g., nutritional facts, pricing, promotional incentives, rebates, inventory, retailer URLs for various products, and other information).

External resource(s) 130, 730 may include sources of information, hosts and/or providers of information and/or services outside of the system 100, 700, external entities participating with the system 100, 700 (e.g., cloud storage), and/or other resources. In some implementations, some or all of the functionality attributed herein to external resources 130, 730 may be provided by resources included in the system 100, 700.

Server 102, 702 (e.g., content and/or purchase servers) may include communication lines, components, or ports to enable the exchange of information with a network, merchandising communication system(s) 134, 734, external resource(s) 130, 730, and/or computing platform(s) 124, 724. Illustration of servers 102 in FIGS. 1 and 702 in FIG. 7 are not intended to be limiting. Global content server 102, 702 may include a plurality of hardware, software, and/or firmware components operating together to provide the functionality attributed herein to servers 102, 702. For example, servers 102, 702 may be implemented by a cloud of computing platforms operating together as server 102, 702.

Electronic storage 132, 732 may comprise electronic storage media that electronically stores information. The electronic storage media of electronic storage 132, 732 may include one or both of system storage that is provided integrally (i.e., substantially non-removable) with server 102, 702 and/or removable storage that is removably connectable to server 102, 702 via, for example, a port (e.g., a USB port, a firewire port, etc.) or a drive (e.g., a disk drive, etc.). Electronic storage 132, 732 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 132, 732 may include one or more virtual storage resources (e.g., cloud storage, a virtual private network, and/or other virtual storage resources). Electronic storage 132, 732 may store software algorithms, information determined by processors 106, 706, information received from computing platforms 124, 724, information received from merchandising communication system(s) 134, 734, and/or other information that enables servers 102, 702 to function as described herein.

Processor(s) 106, 706 may be configured to provide information processing capabilities in server(s) 102, 702. As such, processor(s) 106, 706 may include one or more of a digital processor, an analog processor, a digital circuit designed to process information, an analog circuit designed to process information, a state machine, and/or other mechanisms for electronically processing information. Although processor(s) 106, 706 is shown in FIG. 1, FIG. 7 as a single entity, this is for illustrative purposes only. In some implementations, processor(s) 106, 706 may include one or more processing units. The processing units may be physically located within the same device, or processor(s) 106, 706 may represent processing functionality of a plurality of devices operating in coordination.

Processor(s) 106, 706 may be configured to execute components 108, 110, 112, 114, 746, 748, and/or 750 by software, hardware, firmware, some combination of software, hardware, and/or firmware, and/or other mechanisms for configuring processing capabilities on the processor(s) 106, 706. It should be appreciated that, although components 108, 110, 112, and/or 114, are illustrated in FIG. 1 and components 746, 748, and/or 750 are illustrated in FIG. 7 as being co-located within a single processing unit, in implementations in which processor 106, 706 includes multiple processing units, one or more of such components may be located remotely from the other components. The description of the functionality provided by the different components described herein is for illustrative purposes and is not intended to be limiting, as any of components may provide more or less functionality than is described. For example, one or more of components may be eliminated, and some or all of its functionality may be provided by other ones of components and/or other components. As another example, processor 106 may be configured to execute one or more additional components that may perform some or all of the functionality attributed herein to one of components 110, 112, and/or 114. Similarly, processors of a computing platform 724 may be likewise configured.

Figure 8:
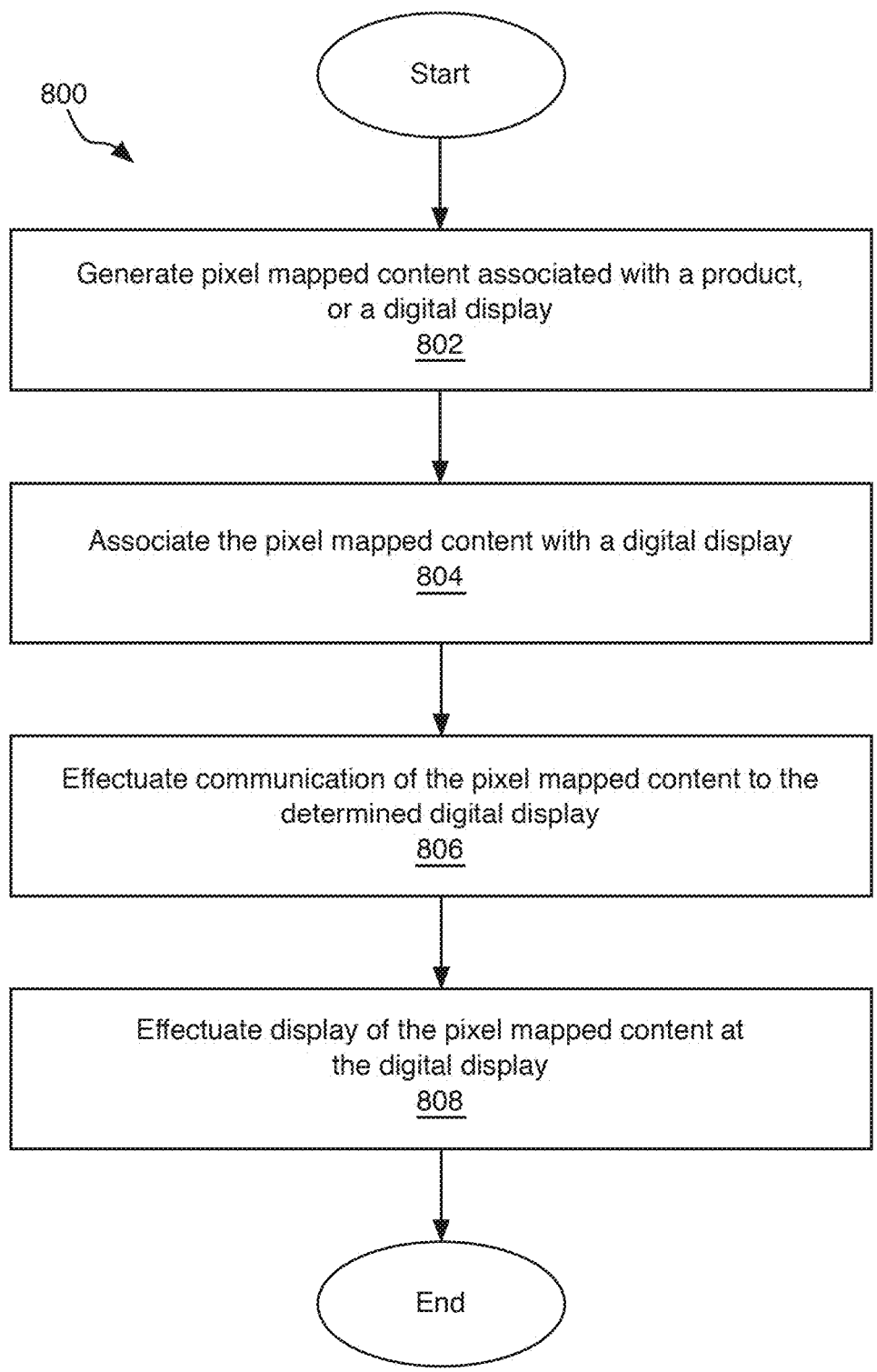
FIG. 8 illustrates an exemplary method of serving pixel mapped content to a merchandising communication system.

FIG. 8 illustrates method 800 of serving pixel mapped content to one or more (e.g., retail) display units. At an operation 802 of a method 800, pixel mapped content is generated. In some instances, the pixel mapped content is pixel mapped text, a pixel mapped barcode, or other types of pixel mapped content. In some instances, the pixel mapped content is generated from non-pixel mapped content. For example, in some instances, non-pixel mapped content (e.g., user input text, a barcode associated with a product and/or retailer, or the like) is identified as needing to be pixel mapped. In other embodiments, based the identity of a product, e.g., associated with a display unit of a merchandising communication system described herein, and/or user inputs, content is directly generated in a pixel mapped format. At an operation 804 of method 802, pixel mapped content is associated with a product and/or a specific display unit on which the pixel mapped content will ultimately be displayed. At operation 806 of method 802, the pixel mapped content is communicated to that display unit. And, at operation 808 of method 802, the pixel mapped content is ultimately displayed on that display unit. Details on how such operations are effectuated and/or modified are described throughout this specification.

Figure 9:
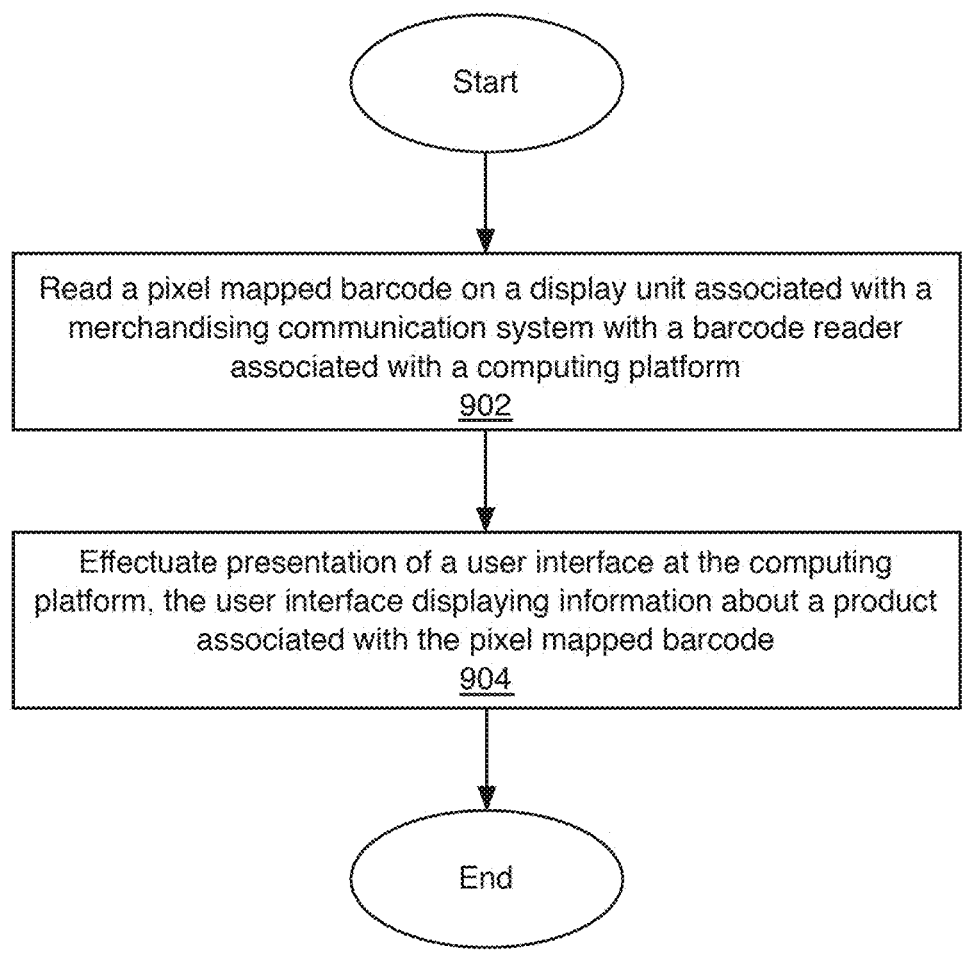
FIG. 9 illustrates method of reading pixel mapped content that is displayed on a display units.

FIG. 9 illustrates method 900 of reading pixel mapped content (pixel mapped barcodes in particular) that is displayed on a display units, e.g., as effectuated by a method of FIG. 8. At operation 902 of method 900, a pixel mapped barcode may be read using a barcode reader associated with a computing platform, such as a computer platform associated a retail customer. At operation 904 of method 900, presentation of a user interface at the computing platform, such as of a retail customer, is effectuated. In some instances, the user interface displays information (e.g., such as product information for a product associated with the barcode, such as described in more detail herein) and/or is configured to allow user input (e.g., such as purchase information, such as described in more detail herein), which may be communicated to a retailer purchasing system, such as described in more detail herein. Further method steps consistent with the purchasing the product using the user interface, and as described in more detail in the system sections herein, may also be utilized.

The methods 800 and/or 900 may be implemented in a computer system in accordance with one or more implementations. The operations of methods 800 and/or 900 presented herein are intended to be illustrative. In some implementations, method 800 may be accomplished with one or more additional operations not described and/or without one or more of the operations discussed. Additionally, the order in which the operations of methods 800 and/or 900 are illustrated in FIG. 8 and/or FIG. 9 and described herein is not intended to be limiting. In some embodiments, the description of system configurations and functions, and details thereof, described herein are optionally utilized in method steps herein. Similarly, in some instances, disclosure of methods herein are further intended provide disclosures of system functionality herein.

In some implementations, one or more implementations of methods 800 and/or 900 may be implemented in one or more physical processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 800 and/or 900 in response to machine-readable instructions stored electronically on one or more electronic storage mediums. The one or more physical processing devices may include one or more devices configured through hardware, firmware, and/or software to be specifically designed for execution of one or more of the operations of methods 800 and/or 900.

In some instances, provided herein is a method of serving pixel mapped content, such as pixel mapped barcode content, to a merchandising communication system associated with a retail environment. As discussed herein, such methods may provide system functionality that is inferior or unable to be achieved in the absence of such processes.

In some instances, pixel mapped content (e.g., a pixel mapped barcode) is generated and is communicated to a merchandising communication system comprising at least one display unit, such as described herein. In some embodiments, pixel mapped content is generated de novo based on any number of input values, such as illustrated in FIG. 5. In other instances, content is generated in a non-pixel mapped format based on any number of input values, such as illustrated in FIG. 5, such content subsequently being converted to pixel mapped format. In specific embodiments, a process described herein comprises reading and/or otherwise accessing pixel-mapped content from an electronic storage prior to effectuating communication of the pixel mapped barcode to the digital display. In other words, in some instances, pixel mapped content is generated and stored for use as needed. In further or alternative embodiments, a method provided herein comprises identifying a product or content (e.g., associated with a merchandising system described herein) and generating a pixel mapped content (e.g., based on the identified product (e.g., by generating new content) or content (e.g., by converting non-pixel mapped content to pixel mapped content).

In certain embodiments, pixel mapped content is generated by analyzing previously generated non-pixel mapped content by generating content on a pixel by pixel basis. In specific instances, the pixel-by-pixel mapping comprises setting each pixel as either "on" or "off," such as with each "on" and "off" configuration having a substantially similar (such as discussed herein) brightness and/or color. Pixel mapped content may have any suitable color or brightness for the "on" and "off" configurations, such as black for "off" and white for "on." Once pixel mapped content is generated, it may be provided a merchandising communication system described herein and displayed thereon (such as on a display unit thereof).

In specific instances, such methods comprise identifying a product or content associated with a merchandising communication system (e.g., a specific display unit thereof). Products may be associated with a merchandising communication system, or display unit thereof, in any suitable manner, such as via a plan-o-gram or similar. In some of such instances, electronic storage is configured to store a correlation between a product or content and a location in a retail environment (e.g., wherein the same or a further electronic storage is configured to store a correlation between elements of a merchandising communication system and the retail environment, thereby allowing correlation between the merchandising communication system and a product or products), or with a specific display unit of a merchandising communication system.

In specific instances, the pixel-mapped content provided is text and/or barcode(s). As discussed herein, the pixel mapping of such content allow functionality of systems described herein that may be less than optimal (such as with displaying text) or is impossible (such as with displaying readable barcodes). In some instances, methods provided herein comprise displaying a pixel mapped barcode displayed on a merchandising communication system, and reading the pixel mapped barcode with a barcode reader (e.g., associated with a computing platform (e.g., a customer's computing platform) device). In specific embodiments, upon reading of the pixel mapped barcode displayed on the merchandising communication system, a computing platform device associated with the barcode reader effectuates presentation of a user interface. In specific embodiments, the user interface is configured to display information about a product associated with the barcode, allow a user to select criteria for purchasing the product, or perform other functions. Further, in some embodiments, the method further comprises receiving a purchase request for the product sent by the customer computer platform device, and/or sending a shipping request to a purchase fulfillment server.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to display pixel mapped information on digital signage, the system comprising:
   a. a digital display including an array of display pixels wherein the array of display pixels comprises an array of viewable light emitting diode (LED) pixels and wherein a pixel pitch of the array is about 1 mm to about 3 mm; and
   b. one or more physical processors configured by machine-readable instructions to:
      i. identify a product or message associated with the digital display, the product or message associated with the digital display being advertised on the digital display;
      ii. identify non-pixel mapped content previously associated with the product;
      iii. generate pixel mapped content associated with the product or message by converting the non-pixel mapped content to a pixel-mapped format, the pixel mapped content comprising a plurality of content pixels, each content pixel being configured to be in either an on or an off setting wherein each content pixel configured in the on setting is configured to have a brightness within a predefined percentage of an average on pixel brightness of the non-pixel mapped content; and
      iv. effectuate communication of the pixel mapped content to the digital display such that the pixel mapped content is displayed on at least a portion of the array of display pixels.

2. The system of claim 1, wherein the pixel mapped content is a linear barcode.

3. The system of claim 1, wherein the pixel mapped content is a matrix barcode.

4. The system of claim 3, wherein the matrix barcode is a quick response (QR) code and the plurality of content pixels forming a pixel array of at least 21×21.

5. The system of claim 1, wherein each content pixel configured in the on setting is configured to have at least one of the same color and the same brightness.

6. The system of claim 5, wherein each content pixel configured in the on setting is configured to be white.

7. The system of claim 1, wherein the pixel pitch of the array is about 1.7 mm to about 2 mm.

8. The system of claim 1, wherein the digital signage is a merchandising communication system associated with a retailer in a physical retail environment.

9. The system of claim 8, wherein the product is an article of merchandise or a service associated with the retailer and is available for purchase in a physical retail environment or using a user interface of a computing platform.

10. The system of claim 8 wherein the pixel mapped content is a pixel mapped barcode, further comprising a customer computing platform device configured to scan the pixel mapped barcode, the one or more physical processors being further configured by machine-readable instructions to:
    v. effectuate reading of the pixel mapped barcode with the customer computing platform device, the customer computing platform device being operated by a customer;
    vi. effectuate presentation of a user interface associated with the barcode at the customer computing platform device, the user interface being configured to display information about the product associated with the barcode or configured to allow the customer to electronically purchase the product associated with the barcode; and
    vii. send a purchase request for the product from the customer computer platform device to the retailer.

11. The system of claim 1, wherein the one or more physical processors is further configured by machine-readable instructions to:
    v. receive a purchase request for the product from a customer user interface associated with the pixel mapped content and the product; and
    vi. send a purchase fulfillment request to a purchase fulfillment server.

12. The system of claim 1, further comprising electronic storage configured to store information about the pixel mapped content and the product associated therewith, and wherein the one or more physical processors is further configured by machine-readable instructions to read the pixel mapped content from the electronic storage prior to effectuating communication of the pixel mapped content to the digital display.

13. A method of serving pixel mapped information to a merchandising communication system associated with a retail environment, the method being implemented in a computer system comprising one or more physical processors and storage media storing machine-readable instructions, the method comprising:
    i. identifying a product associated with a digital display of the merchandising communication system, the product associated with the digital display being at least one of advertised on the digital display or otherwise associated with the digital display;
    ii. identifying non-pixel mapped content previously associated with the product;

iii. generating pixel mapped content associated with the product by converting the non-pixel mapped content to a pixel-mapped format, the pixel mapped content comprising a plurality of content pixels, each content pixel being configured to be in an on or an off setting wherein each content pixel configured in the on setting is configured to have a brightness within a predefined percentage of an average on pixel brightness of the non-pixel mapped content; and iv. effectuating communication of the pixel mapped content to the digital display such that the pixel mapped content is displayed on at least a portion of an array of display pixels of the digital display wherein the array of display pixels comprises an array of viewable light emitting diode (LED) pixels, and a pixel pitch of the array is about 1 mm to about 3 mm.

14. The method of claim 13, wherein the pixel mapped content is one of a linear barcode or a matrix barcode.

15. An interactive method of using a merchandising communication system associated with a retail environment, the interactive method being implemented at least in part through a computer system comprising one or more physical processors and storage media storing machine-readable instructions, the method comprising:

i. identifying non-pixel mapped content previously associated with a product, the product being advertised on a digital display of the merchandising communication system;

ii. generating pixel mapped content by converting the non-pixel mapped content to a pixel-mapped format wherein the pixel mapped content is associated with the product, the pixel mapped content comprising a plurality of content pixels, each content pixel being configured to be in an on or an off setting wherein each content pixel configured in the on setting is configured to have a brightness within a predefined percentage of an average on pixel brightness of the non-pixel mapped content; and iii. effectuating communication of the pixel mapped content to the digital display such that the pixel mapped content is displayed on at least a portion of an array of display pixels of the digital display wherein the array of display pixels comprises an array of viewable light emitting diode (LED) pixels, and a pixel pitch of the array is about 1 mm to about 3 mm.

16. A system configured to display pixel mapped information on digital signage, the system comprising:

a. a digital display including an array of display pixels; and b. one or more physical processors configured by machine-readable instructions to:

i. identify a product or message associated with the digital display, the product or message associated with the digital display being advertised on the digital display;

ii. generate pixel mapped content associated with the product or message, the pixel mapped content comprising a plurality of content pixels, each content pixel being configured to be in an on or an off setting wherein each content pixel configured in the on setting is configured to have a brightness within a predefined percentage of an average on pixel brightness of the non-pixel mapped content; and iii. effectuate communication of the pixel mapped content to the digital display such that the pixel mapped content is displayed on at least a portion of the array of display pixels;

wherein the one or more physical processors configured by the machine-readable instructions to generate the pixel mapped content are further configured by the machine-readable instructions to identify non-pixel mapped content previously associated with the product and to generate the pixel mapped content by converting the non-pixel mapped content to a pixel-mapped format.

\* \* \* \* \*